Dec. 18, 1923.
F. W. BACON
MILEAGE CHART
Filed July 20. 1922
1,477,801
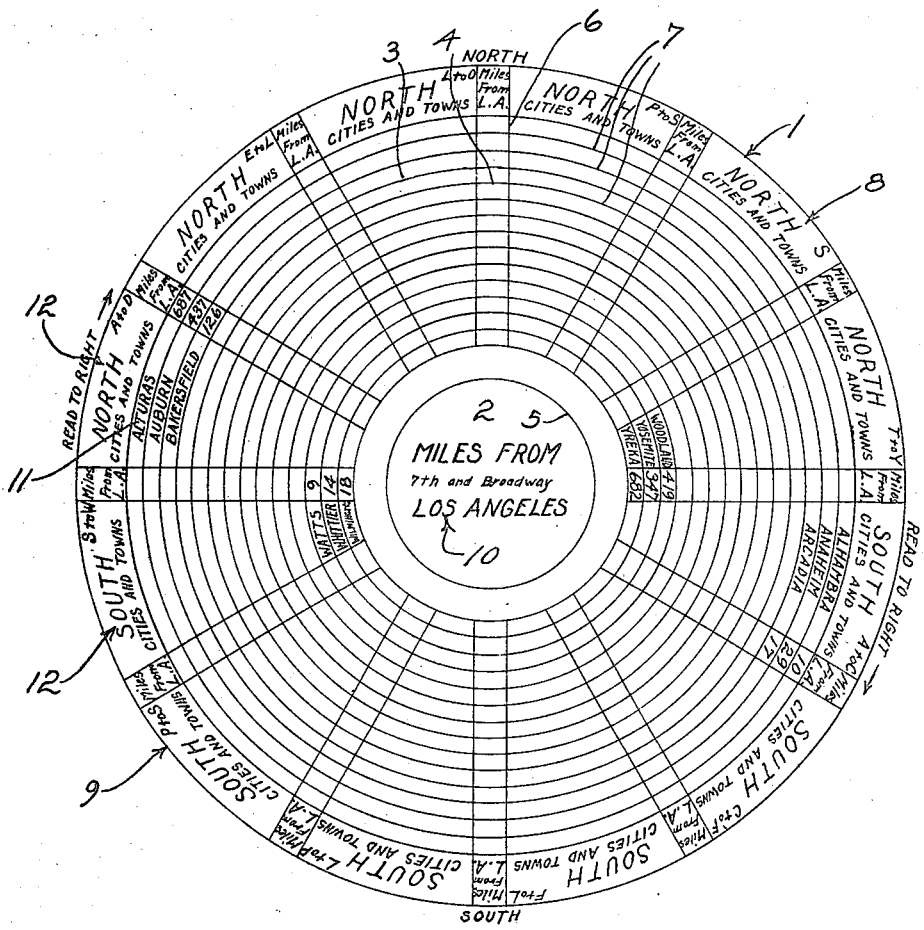
Inventor
FRANK W. BACON
Lyon & Lyon
Attorneys Patented Dec. 18, 1923.

1,477,801

UNITED STATES PATENT OFFICE.

FRANK WILLIAM BACON, OF LOS ANGELES, CALIFORNIA.

MILEAGE CHART.

Application filed July 20, 1922. Serial No. 576,231.

*To all whom it may concern:*

Be it known that I, FRANK W. BACON, a citizen of the United States, residing at Los Angeles, in the county of Los Angeles and State of California, have invented a new and useful Mileage Chart, of which the following is a specification.

This invention relates to charts for readily ascertaining the distance between any two stations, and an object of the invention is to provide for ease of reading the distance between any two stations named on the chart.

The accompanying drawing is a plan view of a chart embodying the invention.

The chart comprises a card or other flat member 1 having a central portion 2 and radially extending portions 3, 4. The central portion 2 is circular, being defined by a circular division line 5. The radial portions 3, 4 are defined by radial division lines 6 which extend from adjacent the line 5 to the periphery of the chart.

The radial portions 3, 4 are separated into arcuate spaces by circular division lines 7. Two opposite pairs of division lines thus divide the chart into two sections indicated by the characters 8, 9. The section 8 is employed for the names of stations that lie approximately in one direction from a main station and the section 9 for the names of those stations lying approximately in the opposite direction. The division lines referred to may run north and south or east and west according to the desire of the constructor. In this particular instance the section 8 is employed for the names of stations lying north of the main station and the section 9 for the names of stations lying south of said main station. The name of the main station is indicated at 10 and is located on the central portion 2. The names of stations lying either to the north or to the south of the main station are printed at 11 and are placed in the arcuate spaces of the radial portions. The distances from the main station 10 to the other stations 11, in any desired unit of measure, are placed opposite the respective stations in the arcuate spaces between certain of the division lines 7. In the particular instance shown the stations, with the exception of the main station, are placed in alphabetical order to facilitate locating the desired station, though it will be readily understood that this is not absolutely necessary. Only a sufficient number of names of stations is printed on the member 1 to make the invention understood.

To use the chart, it is evident that if one desires to know, for example, the distance that Bakersfield lies from Los Angeles he will look for the station name "Bakersfield" on the chart, in alphabetical order in this instance, and read off the distance to the right of the station, in this instance 126 miles. Bakersfield lying north of an east and west line cutting through Los Angeles, it is positioned on that section of the chart where each of the radial columns of stations is headed by the direction-indicating term 12 which, in this instance, is "north." The other section of the chart has its radial columns of stations also headed with the direction-indicating term 12, in this instance "south."

Of course, if one knows that the name of the station he is looking for is located in a certain direction from the main station, he will look for the name on that section of the chart containing the names of stations lying in said direction. If he does not know the direction, he will look on both sections and, after finding the name of the station, its direction from the main station may be known by referring to the direction-indicating term 12 at the head of the column in which the name of said station lies.

I claim:

1. In a mileage chart, a member having a central portion containing the name of a main station, and radial portions containing in radial columns the names of other stations and containing characters representing their distances from the main station.

2. In a mileage chart, a member having a central portion containing the name of a main station, and radial portions containing in radial columns the names of other stations and containing characters representing their distances from the main station, the chart being divided into sections and the names of said other stations being on one section or the other according as said stations lie approximately in one direction from the main station or in the opposite direction.

Signed at Los Angeles, Calif., this 13th day of July, 1922.

FRANK WILLIAM BACON.